Sept. 30, 1947.  E. W. FLEMING  2,428,209
RATIOMETER
Filed Nov. 30, 1944  2 Sheets-Sheet 1

Inventor
Earl W. Fleming
BY
Carlson, Pitzner, Hubbard & Wogu
Attorneys.

Sept. 30, 1947.  E. W. FLEMING  2,428,209
RATIOMETER
Filed Nov. 30, 1944  2 Sheets-Sheet 2
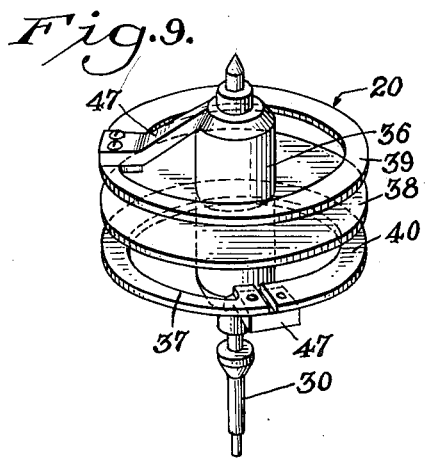
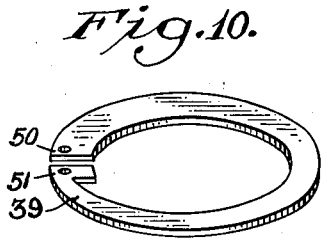
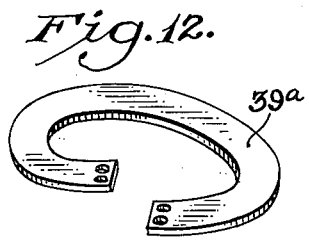
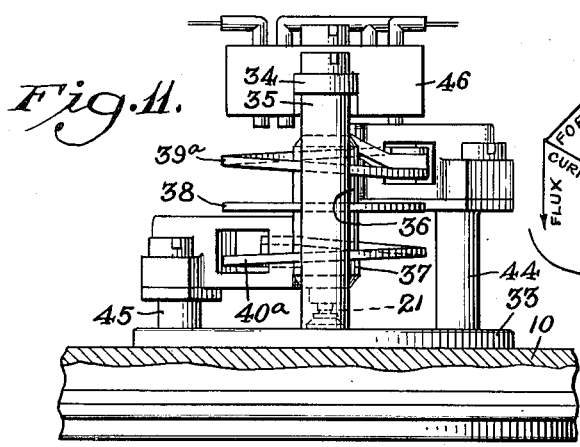
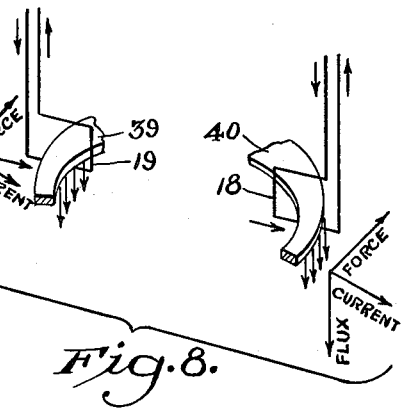
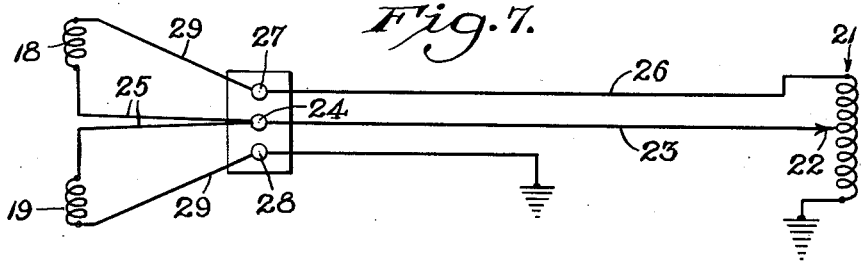
Inventor
Earl W. Fleming
By
Attorneys.

Patented Sept. 30, 1947

2,428,209

UNITED STATES PATENT OFFICE 2,428,209

RATIOMETER

Earl W. Fleming, Chicago, Ill.

Application November 30, 1944, Serial No. 565,918

5 Claims. (Cl. 171—95)

1

The present invention pertains to a novel ratiometer, that is to say, to a novel instrument of the type embodying a pair of actuating windings adapted to be differentially energized and in which the instrument moves an element, such as an indicating needle, in accordance with the ratio of energization of such windings.

One general object of the invention is to provide such an instrument which is of the so-called two wire type but which, unlike any predecessor two wire ratiometers with which I am familar, is adapted to revolve its rotor throughout substantially 360 degrees rather than through a mere 90 or 180 degrees, thus materially enhancing the accuracy and precision of the reading afforded by the instrument.

In a somewhat different aspect, it is an object of the invention to provide a ratiometer in which an opposed, continuously acting pair of motor torques are employed to turn the rotor to a shifting point of balance for such torques and whose location is determined by the ratio of energization of the actuating windings. Such an arrangement, employing true motor torque for operation, is to be contrasted with one utilizing a mere solenoid action from the flux derived from the winding and applied to a ferromagnetic armature.

Further objects and advantages of the invention will become apparent as the following description proceeds, taken in connection with the accompanying drawings in which.

Figure 2:
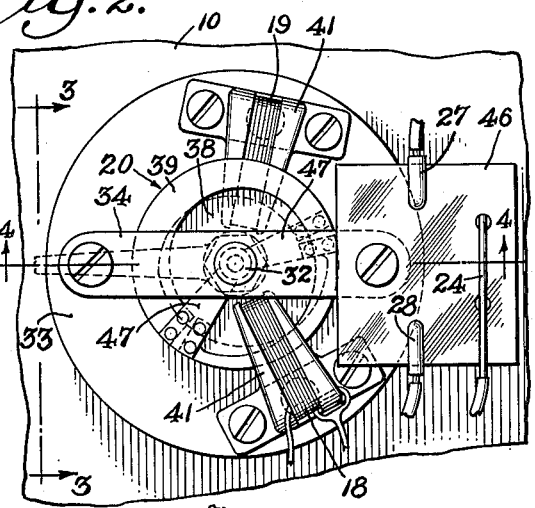
Fig. 2 is an enlarged fragmentary rear elevation of the instrument of Fig. 1 but with the cover removed.
Figure 4:
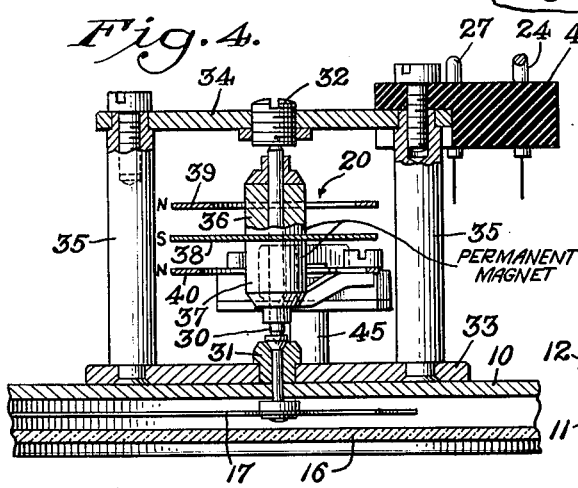
Figure 3:
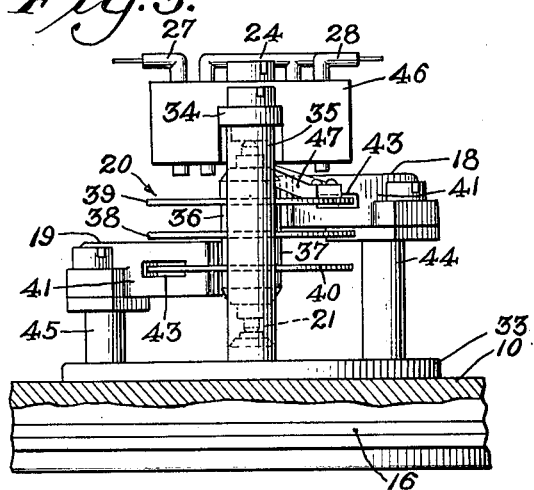

Figs. 3 and 4 are transverse sectional views taken respectively substantially along the lines 3—3 and 4—4 in Fig. 2.

Figure 5:
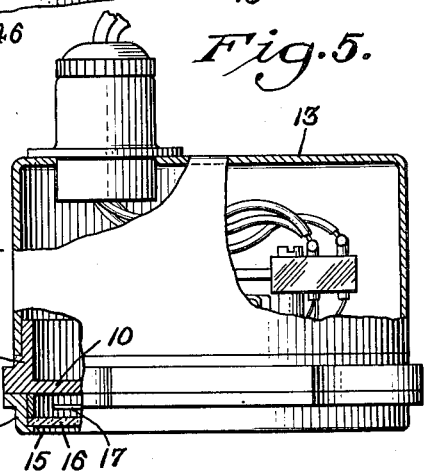

Fig. 5 is a side elevation of the instrument but with portions of the cover and base broken away to expose the interior construction.

Figure 1:
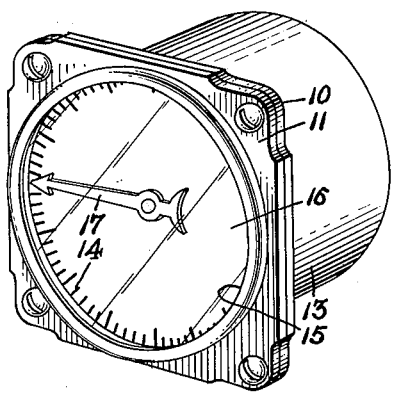
Figure 1 is a perspective view of a ratiometer embodying the present invention.
Figure 6:
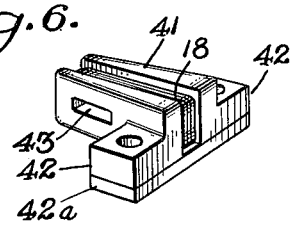

Fig. 6 is a detail perspective view of one of the actuating windings and its mounting block included in the instrument of Fig. 1.

Fig. 7 is a wiring diagram of the connections to the actuating windings for the instrument of Fig. 1.

Fig. 8 is a schematic representation of a portion of the instrument together with current-flux-force diagrams for the same.

Fig. 9 is a detail perspective view of the rotor for the instrument of Fig. 1.

2

Fig. 10 is a detail perspective view of one of the pole pieces included in the rotor of Fig. 9.

Fig. 11 is a view similar to Fig. 3 of a modified form of instrument embodying certain aspects of the present invention.

Fig. 12 is a detail perspective view, similar to Fig. 10, of one of the pole pieces included in the rotor of the instrument of Fig. 11.

While the invention is susceptible of various modifications and alternative constructions, I have shown in the drawings and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

Referring more in detail to the drawings, the particular instrument shown therein (see Fig. 1), as an exemplification of the invention, is one which happens to be designed for panel mounting, and for that purpose embodies a generally rectangular base 10 to the front of which is fixed a cover plate 11 of matching shape, the edge portions of the base constituting a mounting flange for the instrument. On the rear face of the base is an upstanding annular shoulder 12 (see Fig. 5) over which is telescoped a cup-shaped sheet metal housing or casing 13. On the front face of the base 10 is a graduated dial 14 (Fig. 1) registering with a central aperture 15 in the cover 11 and overlaid by a transparent glass bezel 16. An indicating needle 17 is arranged to move over the scale 14, the latter extending for nearly 360 degrees or, in other words, for nearly a full revolution of movement of the indicating needle.

The scale 14 may be graduated in various ways depending upon the employment of the instrument. It may, for example, be used to indicate the level in a fuel tank in an airplane or for any one of a great variety of indicating installations.

Turning now to the working parts of the instrument, and with which the present invention is primarily concerned, they include relatively rotatable primary and secondary members, consisting in this instance respectively of a pair of stationary actuating or field windings 18, 19 and a permanent magnet rotor designated generally as 20. In general the arrangement is such that the rotor 20 is turned about its axis in accordance with the differential energization of the windings 18, 19, having a total range of movement of slightly less than 360 degrees. The precise length of the range is, as will hereinafter appear, determined by the dimensions of the parts of the relatively rotating parts which interfere mechanically at opposite ends of the range of rotor movement.

Any suitable transmission setup may be used for differentially energizing the windings 18, 19, a more or less conventional two wire hook-up for that purpose being diagrammed in Fig. 7. As there indicated, the transmitter 21 may be a potentiometer, excited from a suitable direct current source (not shown), and having a sliding contact 22. Such contact is connected by a conductor 23 with instrument terminal 24 which is in turn connected to both windings 18, 19 by leads 25. One end terminal of the potentiometer is connected by a second wire 26 with a second instrument terminal 27, while the opposite end terminal of the potentiometer is connected through ground with the third instrument terminal 28. Such terminals 27, 28 are connected by leads 29 with the remaining ends of the winding terminals. With such a hook-up change in position of the transmitter or potentiometer slider 22 alters correspondingly the ratio of potentials across the instrument windings 18, 19 and hence the ratio of the currents flowing through respective ones of these windings.

The rotor 20 is, as heretofore noted, of a permanent magnet type. In the particular form illustrated (see Figs. 2, 4, 9 and 10) it consists of an arbor 30 journaled in suitable bearings 31, 32 and having the indicating needle 17 fixed to one end of it. The inboard bearing 31 is staked in a disk-shaped mounting plate 33 fixed to the face of the base 10. The outboard bearing 32, on the other hand, is fixed on a transverse strut 34 carried by a pair of studs 35 rising from the plate 33.

A permanent magnet core or slug is pressed on the arbor 30 and in this instance is generally cylindrical in shape, being divided into upper and lower sections 36, 37. Clamped between these core sections 36, 37 is a disk-shaped soft iron pole piece 38, while to the opposite ends of the core 36, 37 are fixed two generally annular pole pieces 39, 40. The latter pole pieces 39, 40 are of opposite polarity to the central pole piece 38. For example, as indicated by the letters N and S in Fig. 4, the end pole pieces 39, 40 may be north poles and the intermediate pole piece 38 a south pole. The single intermediate pole piece is thus companion to both of the two end pole pieces 39 and 40.

The end pole pieces 39, 40 are linked by respective ones of the actuating windings 18, 19 and for that purpose are arranged to extend generally axially through the open centers of such windings (see Figs. 2 and 3). In the present instance the actuating windings are wound about grooved supporting blocks 41 of molded plastic (Figs. 2 and 6) having laterally extending supporting ears 42. Rectangular openings 43 in the blocks 41 extend axially of the coils wound thereon and the respective pole pieces pass through these openings with ample clearance for free and unimpeded movement. Such blocks 41 are fixed to the upper ends of respective ones of supporting studs 44, 45 staked to the plate 33, spacers 42a being interposed beneath the blocks 41. In the present instance the windings 18, 19 are mounted with a spacing from each other of approximately 120 degrees circumferentially of the rotor although such spacing may be chosen, as desired, to accommodate ease of assembly so long as the location of the cooperating pole pieces 39, 40 in the rotor assembly is properly correlated with the winding location. The leads from the windings 18, 19 are carried to the terminals 24, 27, 28 on a terminal block 46 fixed to the outer end of one of the studs 35.

Each of the end pole pieces 39, 40 of the rotor 20 is fixed to its corresponding end of the permanent magnet core 36, 37 by a radially projecting spider arm 47. Such spider arms are made of ferromagnetic material and complete the magnetic circuit from the core to their associated generally annular pole pieces. These arms 47 are narrow in width or, in other words, in a direction circumferentially of the pole pieces which they support. Likewise, the windings 18, 19 are narrow in the same direction. This affords a maximum range of rotative movement for the armature, such range being limited by the engagement of the opposite sides of the spider arms with the corresponding opposed side faces of the windings, or more precisely, of the blocks 41 which support the windings. To maximize the range of turning movement for the armature, the winding supporting blocks 41 are preferably tapered toward their inner ends as shown (see Fig. 2).

Pursuant to the aim of the present invention to utilize a true motor action type of torque on the rotor 20 in moving the same, the several pole pieces of the rotor 20 are arranged so that the flux passing between pole pieces of opposite polarity (i. e., between pole pieces 38, 39, and between pole pieces 38, 40) will vary progressively in a direction circumferentially of the rotor but in opposite directions for the two fields cutting respectively the windings 18 and 19. It is for that purpose that the pole pieces 39, 40 are tapered circumferentially and in opposite directions. As indicated in Fig. 10, the pole pieces 39 may consist of an iron stamping which, although generally annular in shape, diminishes progressively and uniformly in width from its larger end 50 to its smaller end 51. For the sake of maximum mechanical strength, it is desirable to attach the spider or supporting arm 47 to these two end portions, uniting them firmly. The other end pole piece 40 is a duplicate of the pole piece 39 just described except that it tapers in the opposite direction. The amount of flux joining the central pole piece 38 with each of the end pole pieces 39, 40 in any incremental portion along the length of the latter is dependent directly upon the area of the face of such end pole pieces presented to the intermediate pole piece. Consequently the strength of the magnetic flux field joining the central pole piece 38 to each of the end pole pieces 39, 40 varies progressively and uniformly circumferentially of the latter and in opposite directions, being directly proportional to the width of the faces of such end pole pieces.

Such a uniform taper of the pole pieces 39, 40 is used to obtain a linear response in rotor position to alteration in field winding excitation. In the event a non-linear response is desired for any reason, the taper may be changed accordingly in designing the instrument.

Upon analysis, it will be seen that the permanent magnet flux passing between the rotor pole pieces reacts with the field set up by current in the windings 18, 19 to produce two oppositely acting torques tending to revolve the rotor 20. Thus, upon reference to the schematic showing in Fig. 8, it will be seen that the permanent magnet flux passing vertically between the pole pieces 38, 39 is at right angles to the direction of flow of current through the lower side of the winding 18. A motor action thus results which, from application of the familiar lefthand rule, it will be seen tends to cause the pole piece 39 to move through the winding 18 in a direction axially of the latter or, in other words, sets up a torque tending to revolve such pole piece. A similar but oppositely acting torque tends to turn the other end pole piece 40 in the opposite direction. The directions for current and flux flow are so chosen that the torques produced will, as indicated in Fig. 8, tend to advance progressively smaller width portions of the pole pieces into the windings.

The result of the two oppositely acting torques noted is that the rotor 20 tends to turn until the two torques are balanced. Such balance point is varied in a direction circumferentially of the rotor upon change in the ratio of energization of the windings 18, 19. For example, if we assume a reduction in the current in winding 18 and a commensurate increase for the current in 19, the motor torque produced at winding 19 will overbalance that produced at 18 with the result that the rotor 20 tends to turn clockwise (as viewed in Figs. 2 and 8) from its previous point of rest. In the course of such clockwise movement, the portion of the pole piece 39 moving into the winding 18 is of gradually increasing cross-section, while the portion of pole piece 40 moving into the winding 19 is of gradually diminishing cross-section. The motor action produced at 19 is thus gradually diminished and that at 18 gradually augmented until the two finally balance each other again. A change in ratio of energization in an opposite sense results in a similarly effected rotor displacement in the opposite direction. The indicating needle 17, moving with the rotor 20, is thus caused to assume continuously a position corresponding to the ratio of energization of the two windings 18, 19.

In Figs. 11 and 12 is indicated a slightly modified form of instrument also embodying the present invention. The instrument of Fig. 11 is generally the same as that heretofore described except that the form of rotor pole pieces employed in achieving a permanent magnet field of progressively varying strength circumferentially of the rotor is somewhat altered. Thus, instead of using pole pieces 39, 40 which are tapered in width circumferentially, pole pieces 39a, 40a are used which are of uniform width throughout but bent into a generally helical shape so as to vary their spacing from the central pole piece 38. Otherwise the construction may be identical with that heretofore described except that the apertures in the windings through which the pole pieces 39a, 40a pass must be somewhat enlarged so as to accommodate their helical shape. The amount of flux passing between the central pole piece 38 and the two end pole pieces 39a, 40a is, at any point, a function of the spacing from such central pole piece to the end pole piece. Consequently the result of the generally helical shape for the end pole pieces noted is to vary the flux joining the central pole piece with the end pole pieces progressively in a direction circumferential of such end pole pieces. Since the flow of flux in air between two spaced poles is not precisely a linear function of their spacing, a helix of constant pitch cannot be used if linear response for the instrument be desired. Appropriate choice of progressive change in helix pitch will give any desired variation in flux from point to point circumferentially of the pole pieces. In an operational sense the net result is thus substantially the same as that achieved with the rotor of Fig. 9. Further detailing of the instrument of Fig. 11 therefore appears to be unnecessary, corresponding reference numerals having been used for corresponding parts.

I claim as my invention:

1. A ratiometer comprising, in combination, a rotor including a permanently magnetized axially extending central core having a disk-shaped central pole piece of one polarity projecting radially from its mid portion concentrically therewith, means including a pair of concentric generally annular pole pieces of a polarity opposite to that of said central pole piece and fixed to opposite ends of said core in spaced relation to opposite faces of said central pole piece for establishing between such annular pole pieces and said central pole piece flux fields which vary in intensity progressively and in opposite directions circumferentially of the respective annular pole pieces, and a pair of field windings adapted to be differentially energized and linking respective ones of said annular pole pieces with the latter passing axially through their respective associated windings.

2. A ratiometer comprising, in combination, a rotatable arbor having a permanently magnetized core fixed thereto and extending axially thereof, a disk-shaped central pole piece of one polarity projecting radially from the mid portion of said core and concentric therewith, means including a pair of concentric generally annular pole pieces of a polarity opposite to that of said central pole piece spaced from opposite faces of the latter for establishing between such annular pole pieces and said central pole piece flux fields which vary in intensity progressively and in opposite directions circumferentially of the respective annular pole pieces, a pair of field windings adapted to be differentially energized and linking respective ones of said annular pole pieces with the latter passing axially through their respective associated windings, each of said annular pole pieces being fixed to its respective end of said core by a single radially extending spider arm, both of said spider arms and both of said windings being narrow in a direction circumferentially of the annular pole pieces respectively associated therewith to afford a maximum arc of turning for such pole pieces between the points of mechanical engagement of said spider arms with the opposite end faces of the windings which link their respective annular pole pieces.

3. A ratiometer comprising, in combination, relatively rotatable primary and secondary members, said primary member including a pair of windings adapted to be differentially energized, said secondary member embodying means including a permanent magnet structure having two concentric and axially spaced generally annular pole pieces and at least one additional pole piece for producing flux fields joining said annular pole pieces to said additional pole piece or pieces and which vary progressively circumferentially of said annular pole pieces and in respective opposite directions thereabout, and said windings being arranged to link respective ones of said annular pole pieces and with the latter extending axially through their respective associated windings, whereby the reaction of the permanent magnet flux from said annular pole pieces with the fields set up by said windings results in oppositely acting motor torques tending to effect relative rotation between said primary and secondary members in opposite directions.

4. A ratiometer rotor comprising a permanent magnet core having means thereon for mounting the same for rotation, a pair of generally annular pole pieces fixed to opposite end portions of said core concentrically with the latter's rotational axis and spaced from each other along said axis, and means including at least one intermediate pole piece fixed to the intermediate portion of said core between said pair of pole pieces and spaced from the latter by respective gaps for the passage of flux which vary progressively in reluctance and in opposite directions circumferentially of respective ones of said annular pole pieces.

5. A ratiometer comprising, in combination, a rotor including a permanently magnetized axially extending central core with generally annular concentric pole pieces fixed to its opposite ends, said rotor also including at least one additional pole piece projecting from the central portion of said core intermediate said annular pole pieces and to which flux passes from the latter, each of said annular pole pieces being of progressively and uniformly diminishing width from a point of maximum width thereof with such diminishment in width progressing in opposite circumferential directions of the two annular pole pieces, whereby the amount of permanent magnet flux passing from each of said annular pole pieces diminishes progressively circumferentially of the same from said points of maximum width thereof, and a pair of field windings adapted to be differentially energized and linking respective ones of said annular pole pieces with the latter passing axially through their respective associated windings.

EARL W. FLEMING.

REFERENCES CITED

The following references are of record in the file of this patent:

UNITED STATES PATENTS

| Number | Name | Date |
|---|---|---|
| 1,657,855 | Decker | Jan. 31, 1928 |
| 1,705,158 | McCoy | Mar. 12, 1929 |
| 1,033,409 | Joly | July 23, 1912 |
| 1,171,907 | Trent | Feb. 15, 1916 |
| 1,506,552 | Angus | Aug. 26, 1924 |